March 22, 1949.  A. S. McDONNELL  2,465,108
DEVICE FOR FINELY SETTING COMPASS POINTS
Original Filed April 20, 1943
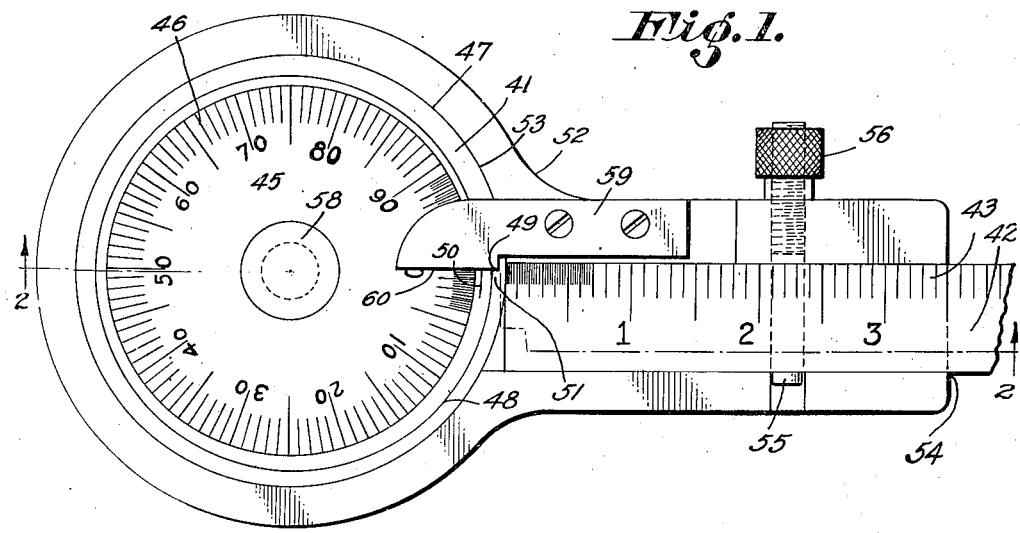
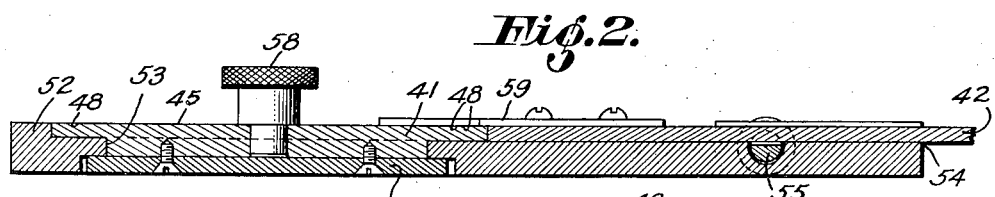
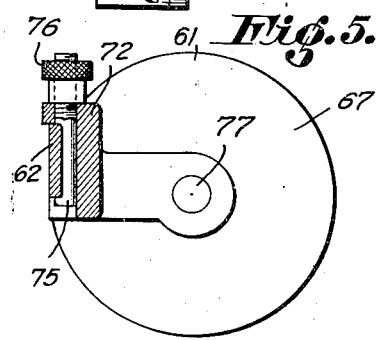
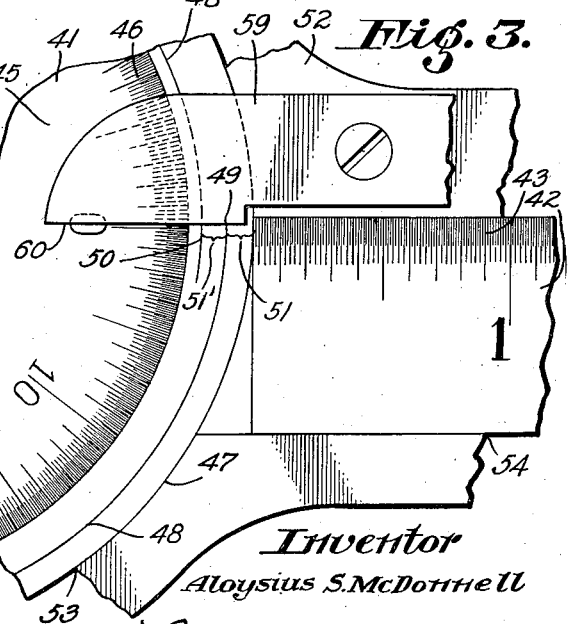
Inventor
Aloysius S. McDonnell
By Louis A. Bisson,
Attorney Patented Mar. 22, 1949

2,465,108

UNITED STATES PATENT OFFICE 2,465,108

DEVICE FOR FINELY SETTING COMPASS POINTS

Aloysius S. McDonnell, Chicago, Ill.

Original application April 20, 1943, Serial No. 483,728, now Patent No. 2,370,741, dated March 6, 1945. Divided and this application September 30, 1944, Serial No. 556,557

9 Claims. (Cl. 33—107)

This is a division of my copending application Serial No. 483,728, filed April 20, 1943, now Patent Number 2,370,741, issued March 6, 1945.

The present invention relates to a device for setting compass points to a very fine degree of accuracy.

Among the objects of the invention is to provide a novel device having graduations or graduation lines which may be arranged in a circular or annular series with a coordinated setting line having a given variant relation to a base or datum line whereby the points of a compass, such as a beam compass, or a divider, or a trammel, and the like, may be set to a minute degree of accuracy.

Other objects, advantages, capabilities, and the like are comprehended by the invention as will later appear, and as are inherently possessed by the invention.

Referring briefly to the drawings,

Fig. 1 is a top plan view of a device constructed in accordance with the invention;

Fig. 2 is a view in section taken in a plane represented by line 2—2 in Fig. 1 of the drawings;

Fig. 3 is a fragmentary plan view on an enlarged scale of the essential parts of the embodiment shown in Figs. 1 and 2;

Fig. 4 is a top plan view of an alternative embodiment of the invention; and

Fig. 5 is a sectional view taken in a plane represented by line 5—5 in Fig. 4 of the drawings.

It is customary for a mechanic or an engineer to set the points of a beam-compass, a dividers, a trammel, and the like, by using a graduated scale; but such a scale as the mechanics and the engineers generally use, comprises among its graduations one set containing 100 graduation lines per inch, but is not graduated finer than such 100 lines per inch. Thereby, it is difficult to set the compass points accurately to any greater degree of fineness than 1/100 of an inch. It is also impractical to calibrate such usual scale much finer than stated above, or as fine as several 100 lines to the inch, since then the graduation lines become too fine to construct and also become too difficult to read readily on the bar-shaped scale of practical size, usually 12 inches in length.

I have therefore provided my improved device whereby the points of a beam-compass and the like can be set to a much finer degree of accuracy than has been done so far with the customary means. With my invention, in either of its forms disclosed herein, I provide a special and finely graduated member and arrange it so that it can be used in conjunction with a known scale bearing standard graduations, including graduations containing 16 lines to 100 lines per inch; and either of such graduations on such scale may be conveniently used with my device, whereby the compass points can be set readily and accurately to 1/10000 part of an inch, more minutely and accurately than was done heretofore.

Referring more in detail to the drawings, the embodiments chosen to illustrate the invention are shown as comprising a circular or annular member 41 (see Figs. 2 and 3) or 61 (see Fig. 4) respectively carrying or bearing graduations 46 and 66, and an associated scale 42 and 62, respectively, carrying or bearing graduations 43 and 63, as shown.

The scale 42 and 62 may be of the customary and standard bar shaped or straight edge construction and bearing the usual graduations 43 and 63, respectively, and these graduations may be 100 to the inch.

More particularly the embodiment shown in Figs. 1, 2 and 3, the disc-shape member 41 is shown as having or bearing on its face 45, graduation lines 46, which extend radially and are arranged in a circular or annular series between the central portion of the disc-shaped member and its periphery, said periphery lying at the peripheral side 47 of the member 41 and serving as a datum or base line for making measurements as herein described. This annular series of graduation lines is located with its outer boundary near or adjacent the periphery or datum or base line of the member 41, and is divided into 10 sections or segments with each section or segment preferably including 100 lines, as shown in Fig. 3, while each line 46 extends radially toward the side or datum or base line 47 against which the end of the scale 42, which is the zero graduation thereof, is abutted whereby said end constitutes a datum or base line which is tangent to said datum or base line 47 at a point where a scale line 46 extended intersects at right angles to said end or side or datum or base line at said end of the scale 42. Where the companion scale used has its graduation lines comprising 100 to the inch, then these graduation lines 46 need not extend entirely around the face 45, as shown in Fig. 1, but only over a section or segment thereof which comprises 100 graduation lines 46 and covers 36 degrees of the 360 degrees of the face 45 illustrated, whereby to provide for the thousandth and the ten-thousandth parts of an inch, such scale 42 provides for setting accurately to the hundredth part of the inch.

A setting line 48 is provided on said face 45, being near or adjacent the peripheral side or line 47 of the member 41, and this line is curved from one of its ends 49 to the other end 50 at a uniform rate of increase away from said side or line 47. Said setting line 48 is cut or etched in the face 45 in the form of a slight groove, as best shown at 48 in Fig. 2, and its initial end 49 is preferably started a slight distance inward from the side 47, being indicated as a width or offset 51 of $\frac{1}{10}$ of an inch. The uniform inward curvature of this setting line 48 is preferably arranged so that in 360 degrees entirely around the face, the increment or space between the end parts of this line, taken radially outward of a line 46, is $\frac{1}{10}$ of an inch, and as is indicated by the space or distance 51' in Fig. 3. Similarly, the inward curvature progress of said setting line 48 amounts to 1/100 part of an inch for its length extending over $\frac{1}{10}$ of the circular face or over 36 degrees of its face. This device is thus also arranged for use in setting the compass points accurately to the 1/10,000 part of an inch.

A frame 52 is provided for rotatively supporting and retaining the member 41 and the scale 42 together in their operative position, and it includes a seat or track or race 53 for rotatably supporting said member 41 therein, and a seat or track or race 54 for receiving therein the scale 42 which may be clamped in place by a clamping element 55 with a nut 56. A retaining plate 57 s secured underneath member 41 and engages beneath this frame 52 for retaining said member rotatably in its seat; while a knob 58 is preferably provided on member 41 to facilitate turning it to the proper position in the frame.

A setting finger 59 may be provided and mounted on the frame 52, and having a guide edge 60 projecting slightly inwardly beyond the inner end portion of the seat or track or race 54 and the zero line of the scale 42, thus providing a setting edge or the like 60 for facilitating the setting of the compass points.

The embodiment shown in Figs. 4 and 5 has a circular or drum shaped member 61 having an annular face 65 having peripheral sides 67 serving as a datum line or base for making measurements as herein described, and the scale 62, which may be used in conjunction with this member, bears the graduation lines 63, as shown. These lines may be provided along a side of the scale only for setting one of the compass points; and the scale is marked for inches with the lines arranged on the decimal system. The annular surface 65 bears graduation lines 66 and the circular edges or peripheral limits 67 provide boundaries or sides or datum lines or bases for the face 65. The graduation lines 66 are placed near or adjacent a side or line 67 and extend perpendicularly thereto, as shown.

A setting line 68 is provided on the face 65, being also preferably placed near or adjacent to the operative side or line 67, and may be cut across the graduation lines, and it is curved or slanted from its initial end 69 to its final end 70, at a uniform rate of increase away from the side or line 67. This line 68 preferably also has its initial end 69 placed $\frac{1}{10}$ of an inch away from the side or line 67, as shown by the offset 71, and also has the final end 70 spaced $\frac{1}{10}$ of an inch from the initial end 69, while the lines 66 are also suitably arranged and divided, similarly to the embodiment shown in Figs. 1, 2 and 3.

A frame 72 may be provided for rotatably supporting the member 61, and it includes a seat or track or race 74 for receiving the scale 62 and comprises a clamping element 75 with an adjustable nut 76 for securing the scale 62 in position with its end or zero line thereof against the side or line 67. The member 61 is turnable on the frame 72 by means of a shaft 77 and a manipulating knob 78 protruding from a side of the member 61. This form of device also is arranged and constructed for setting compass points accurately to the 1/10,000 part of an inch.

By way of illustration and assuming that it is desired to set the points of the compass apart 1.203 inches, one of the points will be set on the 1.1 inch scale mark of the scale 43 or 63, and the other point on the setting line 48 or 68 at the thirtieth division from zero of the scale graduations 46 or 66. This provides the setting of 1.203 inches, which includes the 1.1 inch on the scale 43 or 63, and the $\frac{1}{10}$ of an inch for the offset at the initial end 59 or 69 of the line 48 or 68, and the additional distance or increment of 0.0030 or 0.003 of an inch provided by the slanting of the line 48 or 68 at the point of the 30th division along the length or range of the scale 46 or 66.

While I have herein described and upon the drawing shown a few illustrative embodiments of the invention, it is to be understood that the invention is not limited thereto but comprehends other constructions, details, arrangements or parts, and the like without departing from the spirit of the invention.

Having thus disclosed the invention, I claim:

1. A device as disclosed for the setting of a measuring instrument of the kind likened to a compass, comprising a support, an elongated scale member bearing a set of graduation lines with an end of said member constituting the zero graduation line of the scale graduations on said scale member, a rotatably mounted member on said support and having a periphery which serves as a base line which is tangent with said zero graduation line of said scale member, said rotatably mounted member also having on its surface an annular series of graduation lines extending at normal to said base line, said surface also having a setting line which extends at a small angle to said base line and transversely of said lines of said annular series of graduation lines on said surface at a uniform rate of increase away from said base line, and means on said support having an edge constituting a guiding line which is disposed to be at a normal to said zero graduation line of said scale member for serving as a guide when setting a point of said measuring instrument.

2. A device as set forth in claim 1, and in which said guiding means is in the form of a finger having a portion thereof extending over a portion of said annular series of graduation lines.

3. A device as set forth in claim 1, and in which said support comprises a frame part having a bearing for rotatably supporting said member having said annular series of graduation lines.

4. A device as set forth in claim 1, and in which said support comprises an annular frame part serving as a bearing for the peripheral portion of said rotatably mounted member.

5. A device as set forth in claim 1, and in which said support comprises an elongated portion for supporting said elongated scale member.

6. A device as set forth in claim 1, and in which said support comprises an elongated portion for supporting said elongated scale member, and means for clamping said elongated scale member to said elongated portion of said support.

7. A device as set forth in claim 1, and in which said support comprises a frame part having a bearing for rotatably supporting said member having said annular series of graduation lines, and means for clamping said rotatably mounted member to said annular frame part.

8. A device as set forth in claim 1, and in which said support comprises a frame part having a bearing for rotatably supporting said member having said annular series of graduation lines, and in which said support comprises an elongated portion for supporting said elongated scale member.

9. A device as set forth in claim 1, and in which said support comprises a frame part having a bearing for rotatably supporting said member having said annular series of graduation lines, and in which said support comprises an elongated portion for supporting said elongated scale member, means for clamping said elongated scale member to said elongated portion of said support, and means for clamping said rotatably mounted member to said annular frame part.

ALOYSIUS S. McDONNELL.

REFERENCES CITED

The following references are of record in the file of this patent:

UNITED STATES PATENTS

| Number | Name | Date |
| --- | --- | --- |
| 313,552 | Sweet | Mar. 10, 1885 |
| 452,054 | Sperry | May 12, 1891 |
| 962,702 | Diracca | June 28, 1910 |
| 1,290,343 | Posner | Jan. 7, 1919 |
| 2,039,231 | Lindner | Apr. 28, 1936 |
| 2,370,741 | McDonnell | Mar. 6, 1945 |

FOREIGN PATENTS

| Number | Country | Date |
| --- | --- | --- |
| 695,384 | France | Sept. 29, 1930 |